United States Patent
Watanabe et al.

(10) Patent No.: US 8,426,329 B2
(45) Date of Patent: Apr. 23, 2013

(54) DUPLEX EUTECTIC SILICON ALLOY, MANUFACTURING METHOD THEREOF, AND MANUFACTURING METHOD OF SINTERED COMPACT USING SILICON ALLOY POWDER

(75) Inventors: Toshiyuki Watanabe, Shibuya-ku (JP); Masafumi Matsushita, Yokohama (JP); Toshitaka Sakurai, Yokohama (JP); Kazuya Sato, Yokohama (JP); Yoko Matsushita, Yokohama (JP); Takayoshi Misaki, Hiratsuka (JP); Setsuko Shindo, Kawasaki (JP); Ayumi Shindo, Yokohama (JP); Yumiko Kubota, Kamakura (JP); Akiko Matsushita, Yokohama (JP); Kunio Saito, Yokohama (JP); Takumi Shitara, Yokohama (JP); Futoshi Yanagino, Kawasaki (JP); Takashi Yoshida, Kawasaki (JP); Takashi Mizushima, Saitama (JP); Osamu Matsuzono, Saitama (JP); Kazuaki Sato, Nagoya (JP); Kouki Shimizu, Adachi-ku (JP)

(73) Assignee: Sumikin Bussan Corporation, Osaka (JP)

( * ) Notice: Subject to any disclaimer, the term of this patent is extended or adjusted under 35 U.S.C. 154(b) by 20 days.

(21) Appl. No.: 12/917,820

(22) Filed: Nov. 2, 2010

(65) Prior Publication Data
US 2011/0105297 A1 May 5, 2011

(30) Foreign Application Priority Data
Nov. 2, 2009 (JP) .................................. 2009-251847

(51) Int. Cl.
*C04B 35/599* (2006.01)

(52) U.S. Cl.
USPC ............................ 501/98.1; 264/647; 264/649

(58) Field of Classification Search ................. 501/98.1, 501/98.3; 264/647, 649
See application file for complete search history.

(56) References Cited

U.S. PATENT DOCUMENTS

| | | | | |
|---|---|---|---|---|
| 4,935,389 A | * | 6/1990 | Umebayashi et al. | 501/98.1 |
| 5,023,216 A | * | 6/1991 | Anseau et al. | 501/98.3 |
| 5,851,943 A | * | 12/1998 | Barris et al. | 501/98.1 |
| 6,066,583 A | * | 5/2000 | White | 501/98.1 |
| 2004/0222572 A1 | * | 11/2004 | White | 264/647 |

FOREIGN PATENT DOCUMENTS

JP 07-196375 * 8/1995

OTHER PUBLICATIONS

Eutectic System, Wickipedia, Aug. 2012, 1 page.*

* cited by examiner

*Primary Examiner* — Karl Group
(74) *Attorney, Agent, or Firm* — Howson & Howson LLP

(57) ABSTRACT

A duplex eutectic silicon alloy including 30-70 weight % silicon, 10-45 weight % nitrogen, 1-40 weight % aluminum, and 1-40 weight % oxygen has a eutectic structure comprising a β'-sialon phase and an o'-sialon phase. The alloy is produced by controlling cooling at a rate of 50° C. or less per minute in combustion synthesis. A ductile sintered product capable of replacing steel in various applications can be produced by placing a compact composed of a powder of the alloy in a sintering furnace which can supply a heat quantity at least ten times the heat capacity of the compact; and sintering the compact at a pressure at least as great as atmospheric pressure, within a nitrogen atmosphere in which the silicon gas mole fraction is 10% or more, and at a temperature within the range from 1400° C. to 1700° C.

7 Claims, 7 Drawing Sheets

SEM photo of sintered compact of duplex eutectic silicon alloy

SEM photo of fracture surface of sintered duplex eutectic silicon alloy

US 8,426,329 B2

DUPLEX EUTECTIC SILICON ALLOY, MANUFACTURING METHOD THEREOF, AND MANUFACTURING METHOD OF SINTERED COMPACT USING SILICON ALLOY POWDER

CROSS-REFERENCE TO RELATED APPLICATION

This application claims priority on the basis of Japanese patent application 251847/2009, filed Nov. 2, 2009. The disclosure of Japanese application 251847/2009 is hereby incorporated by reference.

FIELD OF THE INVENTION

This invention relates to a duplex eutectic silicon alloy, a method for its manufacture, and a method for manufacture of sintered compacts using a duplex eutectic silicon alloy powder.

BACKGROUND OF THE INVENTION

Because of their high strength and toughness, various duplex alloys have been used in the field of iron alloys known as "special steels." A number of special steels with various two-phase structures have been in practical use. A representative special steel is the duplex stainless steel standardized under Japanese Industrial Standard JIS SUS329J1.

In the ceramics field, on the other hand, research and development of single-phase ceramics and putting them to practical use is being promoted. By the use of combustion synthesis under controlled pressure and temperature, we have succeeded in synthesizing a "silicon alloy" from inexpensive silicon, which exists in the Earth's crust in large quantities, and are promoting its practical application as a structural material to replace special steels. Duplex ceramics, however, are yet to be developed.

Relevant prior art can be found in unexamined Japanese Patent Publication No. 91272/2004, unexamined Japanese Patent Publication No.162851/2008, Japanese Patent Publication No. 4339352, Japanese Industrial Standard JIS G4304-1999, and in Toshiyuki Watanabe et al., "FC Report 26," p. 68, Japan Fine Ceramics Association, Tokyo, 2008.

A major difference between fine ceramics and steels as structural materials lies in their plastic deformability. It has been generally recognized that ceramics are brittle, whereas steels are tenacious, and it has been considered that ceramics are unable to replace steels completely because ceramics exhibit brittle fracture morphology.

Because it is a solid solution, a silicon alloy has a good chance to be composed of two phases by utilizing eutectic reaction after combustion synthesis. Ceramics with a duplex structure, combining advantages of each phase, have a good chance to exhibit ductility similar to that of duplex steels, and are expected to be much stronger than traditional single-phase ceramics.

However, only a single-phase silicon alloy has been obtained by conventional combustion synthesis. The reason appears to be that the conventional combustion synthesis process employs a small combustion synthesis apparatus and a cooling apparatus having a high cooling capacity. Therefore the silicon alloy is cooled too rapidly. The same can be said concerning metals such as steels. That is, slow cooling is necessary in order to obtain eutectic properties. Accordingly, there is a good chance that a silicon alloy having a duplex eutectic structure can be obtained by controlling the cooling rate following combustion synthesis.

Such duplex eutectic silicon alloys can be commercialized easily by applying the manufacturing processes described in Japanese Patent Applications Nos. 158407/2009 and 202440/2009, which processes are already in practical use. The latter Japanese patent application corresponds to U.S. patent application Ser. No. 12/871,009, filed Aug. 30, 2010, the disclosure of which is incorporated by reference.

Thus, it can be expected that development of a duplex eutectic silicon alloy will increase the chance for ceramics to replace special steels as general-purpose industrial materials, and will expand the fields in which a silicon alloy metal-ceramics can be utilized. Therefore it is an object of this invention to obtain a eutectic silicon alloy having a duplex structure.

SUMMARY OF THE INVENTION

This invention solved the aforementioned problem by means of a duplex eutectic silicon alloy including 30-70 weight % silicon, 10-45 weight % nitrogen, 1-40 weight % aluminum, and 1-40 weight % oxygen, characterized in that, in the alloy, a eutectic structure comprising a β'-sialon phase and an o'-sialon phase is obtained. The eutectic structure preferably occupies an area ratio of at least 60%. If boron is included in the alloy, the area ratio can be reduced to 40% while maintaining a ductile fracture surface rate of 100%. Preferably, the amount of boron in the alloy does not exceed 1 weight %, and the amount of boron is preferably in the range from 0.1-1 weight %.

Further the invention provides a combustion synthesis method for a silicon alloy including 30-70 weight % silicon, 10-45 weight % nitrogen, 1-40 weight % aluminum, and 1-40 weight % oxygen, characterized in that cooling speed in combustion synthesis is controlled at a speed of 50° C. or less per minute so as to obtain a duplex eutectic silicon alloy in which an eutectic structure comprising a β'-sialon phase and an o'-sialon phase is obtained. The eutectic structure preferably occupies an area ratio of at least 60%. Here again, the presence of boron in the alloy allows for a reduction in the area ratio.

Furthermore, this invention provides a method for manufacturing a sintered compact of a duplex eutectic silicon alloy characterized by: shaping a compact using as a raw material a duplex eutectic silicon alloy powder which includes 30-70 weight % silicon, 10-45 weight % nitrogen, 1-40 weight % aluminum, and 1-40 weight % oxygen and in which an eutectic structure comprising a β'-sialon phase and an o'-sialon phase is obtained. The eutectic structure preferably occupies an area ratio of at least 60%. The compact is retained in a sintering furnace which is capable of supplying a heat quantity at least ten times the heat capacity of the compact. The compact is sintered at atmospheric pressure or a higher pressure within a nitrogen atmosphere in which silicon gas mole fraction is 10% or more, and at a temperature within the range from 1400° C. to 1700° C. As in the above-described combustion synthesis method, the presence of boron in the alloy allows for a reduction in the area ratio.

The invention enables manufacture of a duplex eutectic silicon alloy which exhibits a fracture morphology characterized by ductility instead of brittleness. In other words, the inventors succeeded in developing a ceramic which is plastically deformable and much stronger compared to conventional single-phase ceramics. As a result, ceramics will be able to replace steels in more fields, and can be utilized as general-purpose industrial materials across the industry.

DETAILED DESCRIPTION OF THE PREFERRED EMBODIMENT

A duplex eutectic silicon alloy of the present invention will be described with reference to the drawings.

Figure 1:
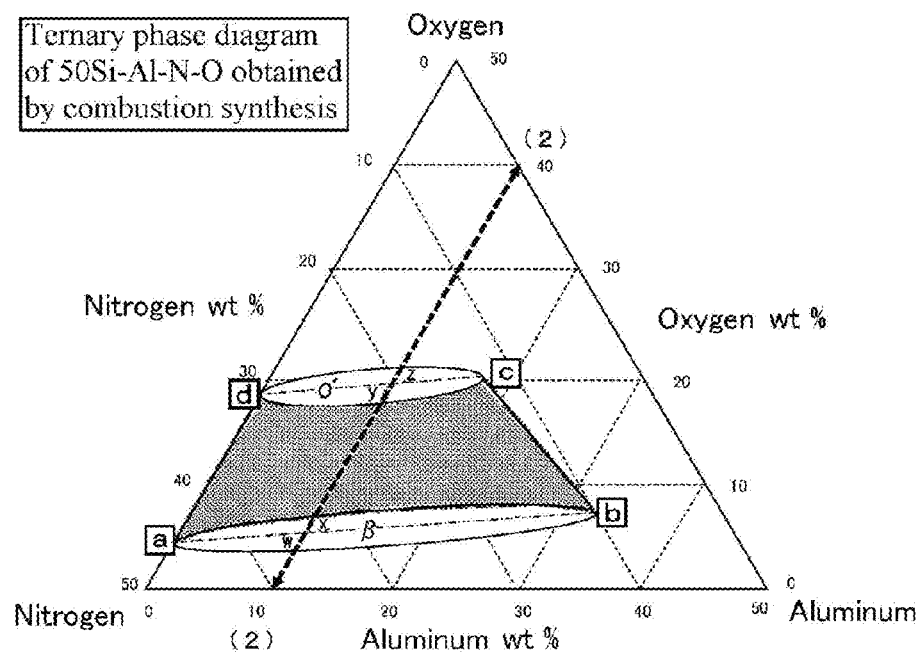
FIG. 1 is a ternary phase diagram of 50Si—Al—N—O produced by combustion synthesis, showing the formation region of a duplex eutectic silicon alloy according to the invention.

FIG. 1 is a ternary phase diagram of silicon alloys with various compositions obtained by combustion synthesis in which silicon was fixed at a constant ratio of 50 weight % and the content rates of three other elements, nitrogen, aluminum, and oxygen, were varied within a total of 50 weight %. β' and o' show a formation region of β'-sialon single-phase and o'-sialon single-phase respectively.

In FIG. 1, a nearly trapezoidal area, framed by a line connecting points a, b, c and d at the ends of the two formation regions of the β'-sialon and o'-sialon single-phases, with the two regions excluded, is a shaded area representing a formation region of a eutectic silicon alloy having a duplex structure. In this region, a homogeneous gas phase appears at a high temperature, while a stabilized phase at a room temperature is a solid phase of β'-sialon and o'-sialon. Therefore, whereas a homogeneous single-phase appears with rapid cooling, a duplex structure appears with slow cooling.

In this invention, the cooling rate in combustion synthesis is controlled at a rate of 50° C. or less per minute. A duplex eutectic silicon alloy comprising β'-sialon and o'-sialon phases can be obtained by means of such slow cooling.

Specific methods of achieving slow cooling include setting the temperature of the cooling water used in a combustion synthesis apparatus relatively high, increasing the volume of the raw material to be supplied, or increasing the amount of the thermal insulation filled around the raw material so as to enhance heat insulation efficiency of the combustion part.

Figure 2:
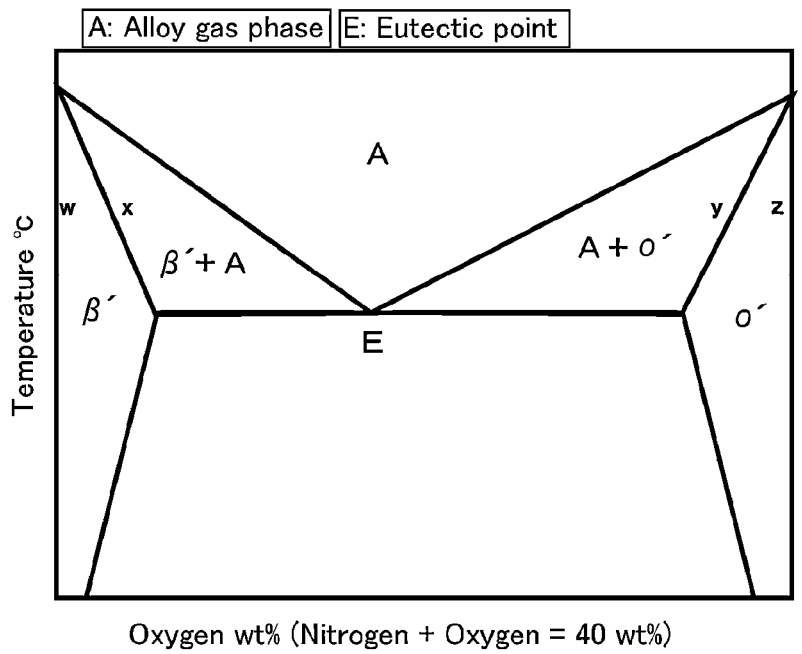
FIG. 2 is an imagined phase diagram along the (2)-(2) line (Si: 50 weight %, Al: 10 weight %) in FIG. 1.

FIG. 2 is an imagined phase diagram along the (2)-(2) line in FIG. 1. The region A represents gas phase with a silicon alloy composition generated in combustion synthesis, and point E is a eutectic point. This diagram indicates that the gas phase with a silicon alloy composition makes a duplex eutectic structure comprising a β'-sialon phase and an o'-sialon phase when it reaches the eutectic temperature through slow cooling at a level of oxygen concentration corresponding to the point E. It is assumed that in the region in which the oxygen level is below the level corresponding to point E, a β'-sialon phase crystallizes out first by slow cooling, and when the temperature reaches the eutectic point, a duplex eutectic comprising a β'-sialon phase and an o'-sialon phase crystallizes out. On the contrary, it is assumed that in the region in which the oxygen level is above the level corresponding to point E, an o'-sialon phase crystallizes out first by slow cooling, and when the temperature reaches the eutectic point, a duplex eutectic comprising a β'-sialon phase and an o'-sialon phase crystallizes out.

Figure 3:
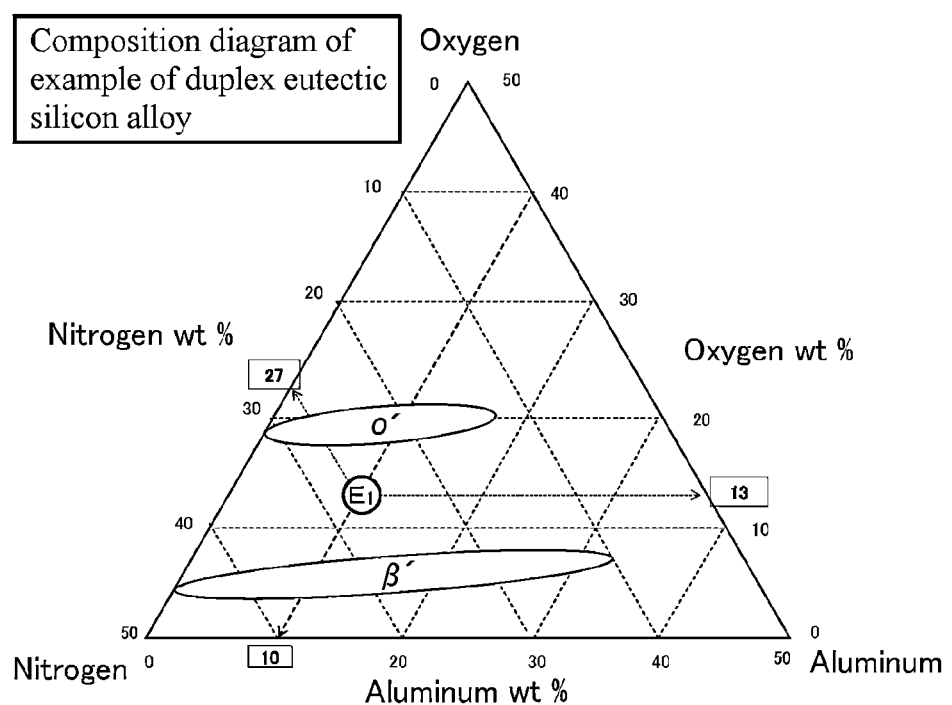
FIG. 3 is a composition diagram of an example of a duplex eutectic silicon alloy according to the invention.

Point E1 in FIG. 3 represents an example of a composition of a eutectic silicon alloy having a duplex structure which was successfully produced based on the assumptions above. The alloy is composed of 50 weight % silicon, 10 weight % aluminum, 27 weight % nitrogen, and 13 weight % oxygen.

Figure 4:
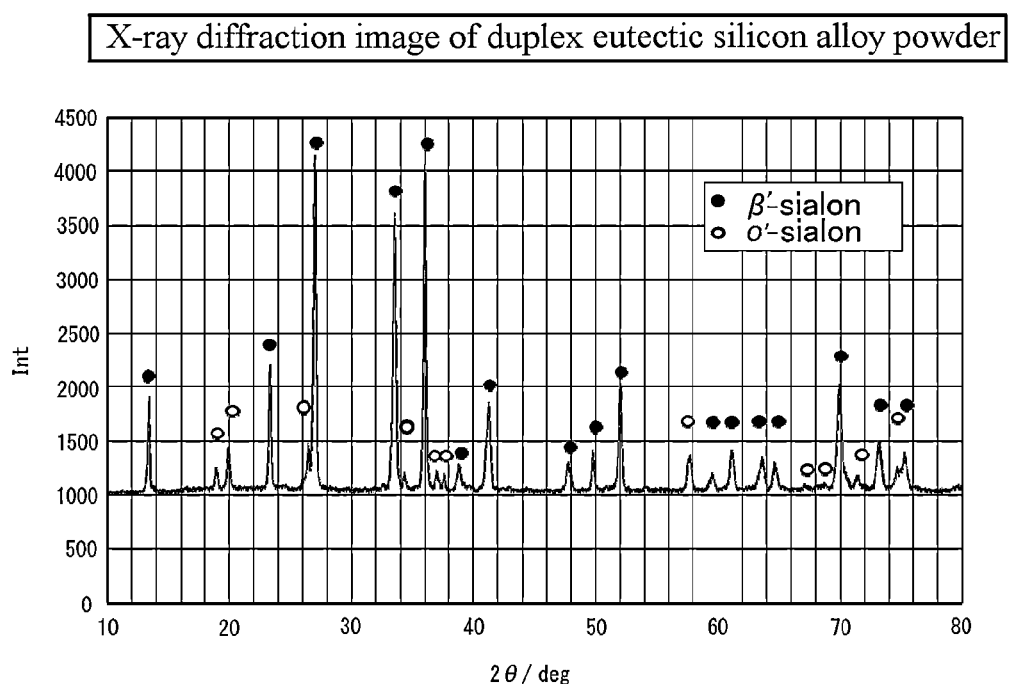
FIG. 4 is an X-ray diffraction image of a duplex eutectic silicon alloy powder according to the invention.

FIG. 4 shows an X-ray diffraction image of a duplex eutectic silicon alloy powder obtained by combustion synthesis. It indicates that a duplex eutectic silicon alloy of the invention has a duplex structure comprising a β'-sialon phase and an o'-sialon phase.

Figure 5:
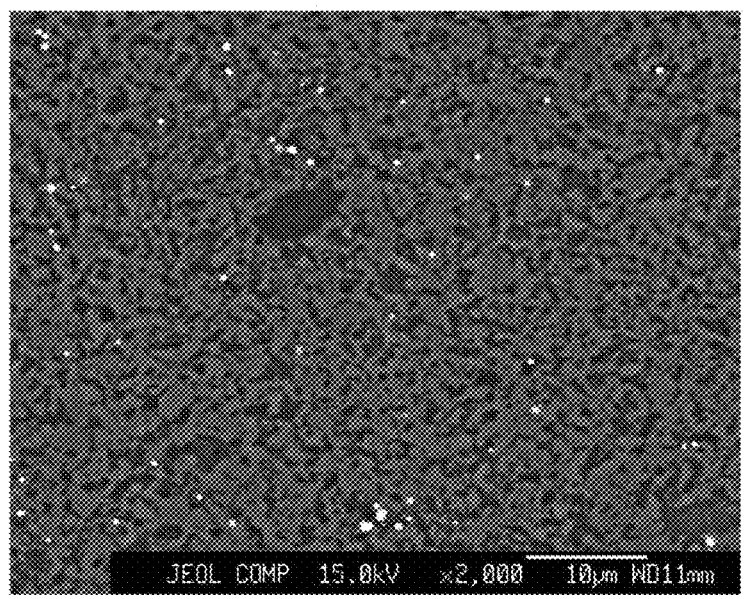
FIG. 5 is a Scanning Electron Microscope (SEM) photo showing the polished surface of a sintered compact obtained by sintering a duplex eutectic silicon alloy powder according to the invention.

FIG. 5 is an SEM photograph of the polished surface of a sintered compact obtained by sintering the powder. The dark islands are the o'-sialon phase crystallized out first, and the rest is a eutectic silicon alloy having a duplex structure.

Figure 6:
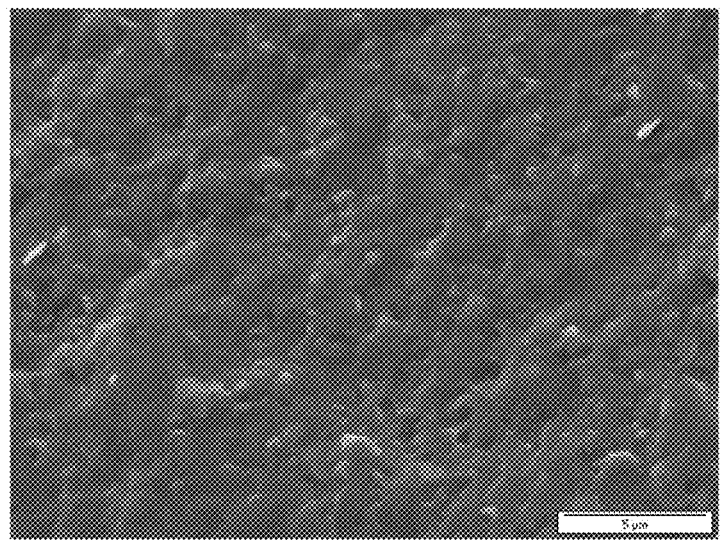
FIG. 6 is an SEM photo showing the result of observation of the fracture surface of a sintered compact made from a duplex eutectic silicon alloy according to the invention.

FIG. 6 is an SEM photograph showing the result of observation of the fracture surface of a sintered compact. The photograph presents a ductile fracture surface instead of a brittle fracture surface as in conventional ceramics.

Research was conducted on various conditions under which the duplex eutectic silicon alloy demonstrates its functional properties.

1. Relationship Between Chemical Component Values and Eutectic Structure Rate

As shown in Table 1, testing materials with various targeted compositions were produced in order to determine the relationship between the compositions on the broken line in FIG. 1 and changes of duplex eutectic structure generation area rates (%). In the compositions silicon and aluminum were fixed at 50 and 10 weight % respectively, while oxygen and nitrogen ratios were varied. It should be noted that the component values are almost equal to the analytical values in the combustion synthesis method.

TABLE 1

| Testing Materials | Si | Al | O | N |
|---|---|---|---|---|
| 1 | 50 | 10 | 4 | 36 |
| 2 | 50 | 10 | 6 | 34 |
| 3 | 50 | 10 | 8 | 32 |
| 4 | 50 | 10 | 10 | 30 |
| 5 | 50 | 10 | 12 | 28 |
| 6 | 50 | 10 | 14 | 26 |
| 7 | 50 | 10 | 16 | 24 |
| 8 | 50 | 10 | 18 | 22 |
| 9 | 50 | 10 | 20 | 20 |

Testing material 1 is composed of β'-sialon single-phase only (see FIG. 1).

In testing material 2, the β'-sialon phase first crystallizes out from the silicon alloy gas phase by cooling after combustion synthesis, and then a duplex eutectic structure with the β'-sialon and the o'-sialon phase is generated through eutectic reaction of the β'-sialon and o'-sialon phase from the alloy gas phase which has come to have a eutectic composition.

Proceeding from testing material 1 to testing material 5 in Table 1, as the composition of the testing materials, approaches the eutectic composition (point E in FIG. 3), where composition is 50 weight % silicon, 10 weight % aluminum, 27 weight % nitrogen, and 13 weight % oxygen, the ratio of the β'-sialon crystallized out first decreases while that of the duplex eutectic structure increases. In testing materials 6-7, when the ratio of oxygen to nitrogen continues to increase beyond the ratio in the eutectic composition, the o'-sialon phase crystallizes out first as the islands seen in FIG. 5. The rest is the eutectic silicon alloy having a duplex structure.

Figure 7:
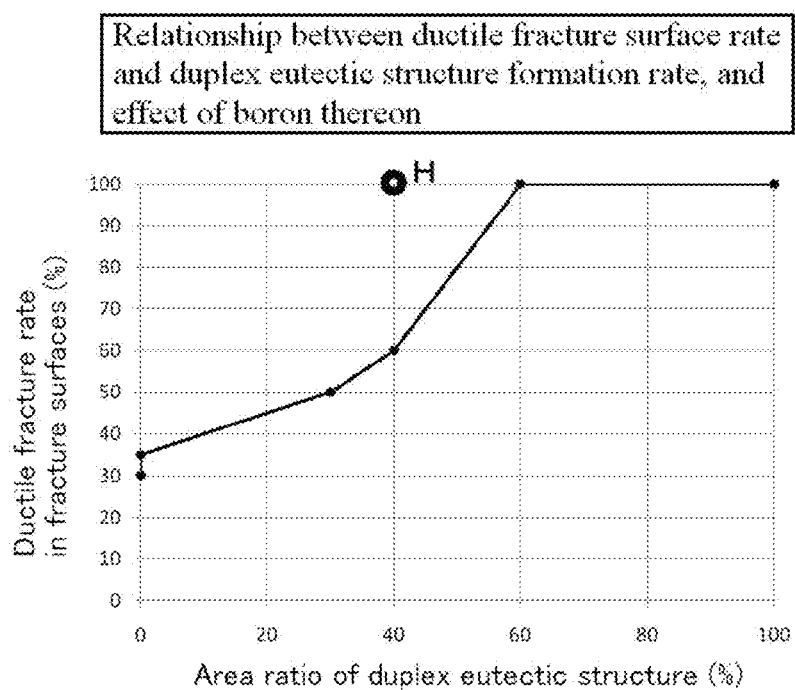
FIG. 7 is a graph showing the relationship between the ductile fracture rate of the fracture surface of a duplex eutectic silicon alloy and the area ratio of a duplex eutectic structure, and the effect of boron thereon.

2. Relationship Between Duplex Eutectic Structure Formation Rate and Ductile Fracture Surface Rate The graph in FIG. 7 shows the relationship between the area ratio of the ductile fracture surface as shown in the SEM photograph of FIG. 6 and the area ratio of a duplex eutectic structure. The graph indicates that the area ratio of the ductile fracture surface rises with the increase of the component ratio of the duplex eutectic structure. This is presumably because a high-integrity grain boundary is formed on the border of the two phases generated by the eutectic reaction.

FIG. 7 indicates that the area ratio of the duplex eutectic structure must be at least 60% to ensure a 100% ductile fracture surface.

3. Effect of Boron on Ductile Fracture Surface Rate

Point H in FIG. 7 represents a measured result of the ductile fracture surface ratio when 0.1 weight % boron, which is used as an alloying additive, was added to a testing material having the same composition as that of testing material 2 in Table 1. Despite the fact that the rate of the duplex eutectic structure was only 40%, the fracture surface rate improved to 100%.

Therefore, a stronger duplex eutectic silicon alloy can be obtained with the addition of boron. However, a preferable amount of addition is 1 weight % at a maximum, because the addition of over 1 weight % boron decreases rather than increases the ductile fracture surface ratio.

Various industrial products which could replace steels can be obtained by powdering the duplex eutectic silicon alloy, and producing and sintering compacts. Thus, what follows is a description of the processes to obtain a sintered compact.

First, a duplex eutectic silicon alloy according to the invention is powdered to a grain diameter of 1 micron or less by means of a powdering apparatus. As the average grain diameter becomes smaller, less sintering additive is necessary; a grain diameter of less than 500 nm produces a high density sintered compact without additives. Preferably, therefore, a silicon alloy is powdered into particles with an average diameter of 500 nm or less in order to improve the relative density after sintering.

The next step is to shape and sinter a compact using the powder as a raw material. The dehydration method described in U.S. patent application Ser. No. 12/871,009, filed Aug. 30, 2010 is preferably used. Specifically, the method comprises the steps of: kneading the raw material with the addition of 10-40 weight % water as a binder to form a kneaded silicon alloy argil; shaping the kneaded argil to form a silicon alloy compact having a three-dimensional shape; putting the compact in a cooling medium within 5 minutes after completion of the shaping step, and retaining the compact in said cooling medium for at least 5 minutes, thereby quick-freezing water contained within the compact in a finely-dispersed condition; retaining the compact in a pressure-regulated container in which the pressure is maintained at a level below the triple point pressure of water; and thereafter, sintering the compact.

This method is capable of removing water within the compact in a finely-dispersed condition before aggregation, and is effective in preventing cracks after sintering. Moreover, the method also enables stable production of high quality ceramic products by shaping duplex eutectic silicon alloy of the present invention using water as a principal binder and without use of harmful organic solvents.

0.5-10 weight % of inorganic binders, which are mostly composed of silicon dioxide and aluminum, and, optionally, up to 5 weight % of sintering additives, may be added with water. As already mentioned, a stronger duplex eutectic silicon alloy can be obtained with an addition of 1 weight % or less boron.

An alternative method comprises the steps of: putting the compact in a container and exposing the compact to a reduced pressure below atmospheric pressure within 5 minutes following completion of the shaping step; exposing the compact to continuous microwave radiation, preferably at 2.450 GHz, for at least 5 minutes; and thereafter, sintering the compact. The above two methods may also be combined by putting the compact in a cooling medium within 5 minutes after completion of the shaping step, retaining the compact in said cooling medium for at least 5 minutes, thereby quick-freezing water contained within the compact in a finely-dispersed condition; putting the compact in a pressure-regulated container in which the pressure is maintained below atmospheric pressure; exposing the compact to continuous microwave radiation of 2.450 GHz for at least 5 minutes; and thereafter, sintering the compact.

The above-described methods enable stable production of high quality ceramic products by removing water within the compact in a finely-dispersed condition before aggregation, thereby preventing cracks after sintering. The addition of inorganic binders, sintering additives, boron, or combinations of these additives can also contribute to the production of high quality ceramic products.

Sintering is conducted under the following conditions. The compact is retained in a sintering furnace which can supply a heat quantity at least ten times the heat capacity of the compact. The "heat capacity" of the compact is defined as the amount of heat required to raise the temperature of the compact from room temperature, i.e., 25° C. to a sintering temperature of 1700° C., an increase of 1675° C. The "heat quantity" supplied by the sintering furnace is defined as the amount of heat supplied by the sintering furnace in a sintering time of three hours. By way of example, in a typical sintering operation, the compact is in the form of balls placed into carbon setters along with a quantity of powder for homogenization of the temperature and the atmosphere within the carbon setters. A typical sintering compact may be composed 53 Kg of balls, along with 83 Kg of powder. The specific heat of the compact is 670 Joules per kilogram per degree. The heat capacity of the compact is therefore 670 J/kg/deg×53 Kg×1675 deg.=59×10$^6$ Joules. A sintering furnace is usually operated at about one half its maximum power. Thus, in the case of a 220 kW sintering furnace, the heat quantity supplied to the compact in three hours is 110×10$^3$ Joule-seconds×3 hours×3600 seconds/hour=1188×10$^6$ Joules, which is about twenty times (i.e., more than ten times) the heat capacity of the compact.

The pressure in the sintering furnace is maintained at atmospheric pressure or higher, within a nitrogen atmosphere in which the silicon gas mole fraction is 10% or more, and the temperature is set in the range from 1400° C. to 1700° C.

If the heat quantity in the sintering furnace is small, the compact may not be sintered sufficiently, because the center of the compact cannot receive sufficient heat even if the temperature rises to a predetermined level at a measuring point. This becomes especially problematic in manufacturing large compacts, such as large bearing balls for windmills. In addition, if the silicon gas mole fraction is low, silicon flies off from the surface of the compact, which can lead to inner cracks. Therefore, sintering under the above-mentioned conditions is effective in sintering large compacts without generating inner cracks.

INDUSTRIAL APPLICABILITY

Since a duplex eutectic silicon alloy according to the invention is far stronger than conventional single-phase ceramics and ceramic products composed of the duplex eutectic silicon alloy have remarkable characteristics such as lightness, high mechanical strength, enhanced fatigue strength, nonmagnetism, heat resistance, and resistance to chemicals. Ceramic products using the silicon alloy are therefore applicable to a variety of purposes. Examples include bearing balls, races for bearing balls, parts for linear motion bearings, automobile power train components, power transmission shafts, turbochargers, exhaust manifolds, fuel injection systems such as common rail fuel injectors, components for turbines and landing gear of aircraft, components of artificial bones and joints, and parts for semiconductor manufacturing machines.

Due to its complete nonmagnetism, a silicon alloy can be advantageously used for bearing members for inverter-type power generators and electric motors. The silicon alloy ceramic material does not need to be treated by coating with nonmagnetic materials such as those that have been applied to ferrous bearing members for the purpose of preventing electric corrosion or iron loss caused by alternating electromagnetic fields. Specifically, the silicon alloy can be applied to bearing balls, roll axes, taper roll axes, and inner and outer races holding these members in wind power stations operated in an alternating electromagnetic field environment. The alloy can also be applied to bearing balls, roll axes, taper roll axes, and inner and outer races holding these members in electric motors of hybrid vehicles and electric vehicles driven in an alternating electromagnetic field environment.

The ceramic material according to the invention can reflect electromagnetic waves at frequencies up to 20 GHz. Accordingly, products made from the ceramic material can be used as parts for blocking electromagnetic waves from electric motors of hybrid vehicles or electric vehicles.

As described above, the duplex eutectic silicon alloy of the invention exhibits ductile fracture morphology instead of brittle fracture. Accordingly, the invention provides ceramics which are plastically deformable and far stronger than conventional single-phase ceramics. The invention overcomes the traditional notions that ceramics are brittle, and steels are tenacious, and that ceramics are incapable of completely replacing steels due to their brittle fracture.

Since the sintering method according to the invention can provide various high quality ceramic products, ceramics will be able to replace steels in more fields of use, and can be utilized as general-purpose industrial materials across industry.

The application of the dehydration method of U.S. patent application Ser. No. 12/871,009 in the process of manufacturing a sintered silicon alloy, also enables stable production of high quality ceramic products using water as a principal binder, without using harmful organic solvents, for shape-forming of the duplex eutectic silicon alloy of the present invention. Accordingly, the sintered silicon alloy of the invention can be produced without generating environmental problems.

What is claimed is:

1. A duplex eutectic silicon alloy including 30-70 weight % silicon, 10-45 weight % nitrogen, 1-40 weight % aluminum, 1-40 weight % oxygen, and elemental boron in an amount up to 1 weight %, sufficient to produce a measurable improvement in the ductile fracture surface rate of the alloy, characterized by a eutectic structure comprising a β'-sialon phase and an o'-sialon phase.

2. A duplex eutectic silicon alloy according to claim 1, in which the eutectic structure occupies an area ratio of at least 60%.

3. A duplex eutectic silicon alloy according to claim 1, in which the eutectic structure occupies an area ratio of at least 40%.

4. A duplex eutectic silicon alloy according to claim 1, in which said elemental boron is present in an amount in the range from 0.1 weight % to 1 weight %.

5. A method for manufacturing a sintered compact of a duplex eutectic silicon alloy characterized by:
    shaping a compact using as a raw material a duplex eutectic silicon alloy powder which includes 30-70 weight % silicon, 10-45 weight % nitrogen, 1-40 weight % aluminum, 1-40 weight % oxygen, and elemental boron in an amount up to 1 weight %, said amount being sufficient to produce a measurable improvement in the ductile fracture surface rate of the alloy, and characterized by a eutectic structure comprising a β'- sialon phase and an o'-sialon phase is obtained;
    retaining the compact in a sintering furnace which can supply a heat quantity at least ten times the heat capacity of the compact; and
    sintering said compact at a pressure at least as great as atmospheric pressure, within a nitrogen atmosphere that includes a silicon gas mole fraction of 10% or more, and at a temperature within the range from 1400° C. to 1700° C.

6. A method for manufacturing a sintered compact according to claim 5, in which the eutectic structure occupies an area ratio of at least 60%.

7. A method for manufacturing a sintered compact according to claim 5, in which the eutectic structure occupies an area ratio of at least 40%.

* * * * *